June 24, 1930.  J. B. GARNER  1,767,357
PROCESS OF MAKING A FUEL GAS
Filed March 30, 1923
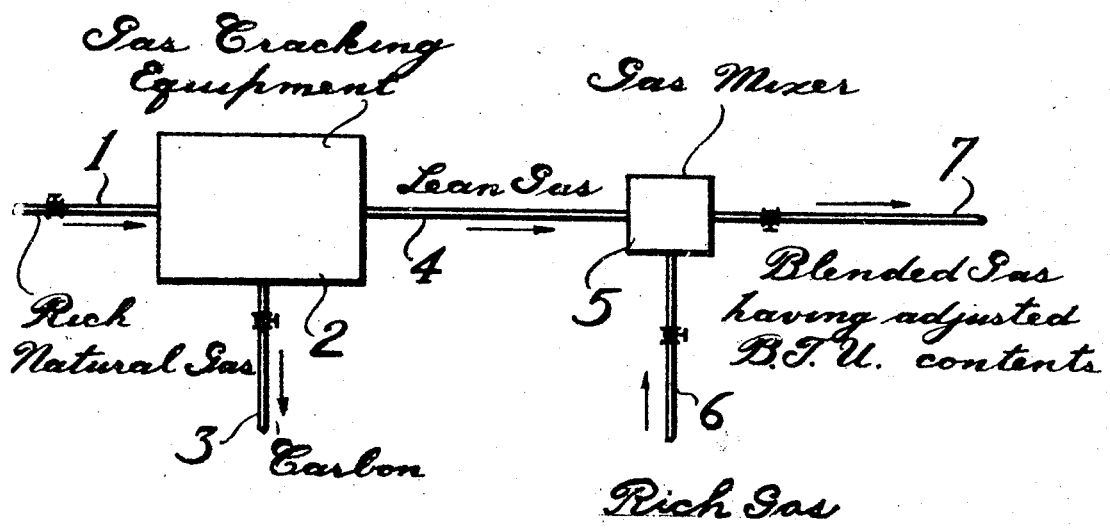
INVENTOR
James B. Garner
BY
W. E. Currie
ATTORNEY Patented June 24, 1930

1,767,357

UNITED STATES PATENT OFFICE

JAMES B. GARNER, OF PITTSBURGH, PENNSYLVANIA, ASSIGNOR TO STANDARD OIL DEVELOPMENT COMPANY, A CORPORATION OF DELAWARE

PROCESS OF MAKING A FUEL GAS

Application filed March 30, 1923. Serial No. 628,771.

This invention relates to the art of obtaining products from gas, and will be fully understood from the following description, read in connection with the accompanying drawing in which the figure is a diagrammatic plan view of equipment suitable for carrying out the process.

In this equipment reference number 1 indicates a pipe supplying rich natural gas to cracking equipment 2 which may be of any suitable type adapted to form carbon black. The latter is removed through an outlet 3. The lean gas resulting from the cracking is passed through a line 4 into a mixer 5 which also receives rich natural gas through a line 6. From the mixer the blended gas flows through a line 7 to the point at which it is to be utilized or stored.

With the declining production of natural gas, a more efficient utilization of such resource is desirable. In particular, since the average natural gas runs unnecessarily high in calorific value for ordinary consumption, a rational conservation would indicate the desirability of removing the excess fuel constituents in the form of valuable products and at the same time providing a finished gas of suitable heat value for ordinary distribution.

In obtaining these results in accordance with the present invention, a gas of high calorific value, for example 1150 B. T. U. per cubic foot is initially partially decomposed, as by electric means or by being heated to a cracking temperature sufficient to produce carbon black and leave a tail gas with a calorific value of for example about 325 to 900 B. T. U. per cubic foot. This may be done in any convenient manner desired, as by passing through retort tubes of suitable temperature, or for instance by bringing the high calorific gas, preheated or not as desired, into admixture with producer gas at a high temperature for example 1500° to 2000° F., in sufficient proportion to raise the high B. T. U. gas to a temperature of about 1200° to 1400° F. The carbon black is collected by suitably cooled plates or chambers, and the tail gas after further cooling if necessary, is blended with sufficient raw high B. T. U. gas, especially natural gas, to give a resultant mixture of for example 800 B. T. U., or whatever the needs in view for the finished gas may require. There is thus obtained a yield of carbon black or gas black, a product increasingly difficult to secure in the quantities commercially demanded, in addition to a finished combustible gas of proper heat value.

What I claim is:

Process of making a fuel gas having a thermal value of substantially 800 B. T. U. per cubic foot and carbon black from natural gas of undesirably high B. T. U. content, comprising decomposing a natural gas having a B. T. U. content in excess of 800 per cubic foot to produce carbon black and a residual gas having a thermal value substantially less than is commercially desirable, collecting said residual gas, collecting the carbon black, and mixing the residual gas with natural gas having a B. T. U. content in excess of commercial requirements, in an amount sufficient to raise the heating value of the mixed gas at least substantially to 800 B. T. U. per cubic foot.

JAMES B. GARNER.